US012781328B2

(12) United States Patent
Sekimukai et al.

(10) Patent No.: US 12,781,328 B2
(45) Date of Patent: Nov. 3, 2026

(54) AUSTENITIC STAINLESS STEEL AND SPRING

(71) Applicant: NIPPON STEEL Stainless Steel Corporation, Tokyo (JP)

(72) Inventors: Kotaro Sekimukai, Tokyo (JP); Kazunari Imakawa, Tokyo (JP)

(73) Assignee: NIPPON STEEL STAINLESS STEEL CORPORATION, Tokyo (JP)

( * ) Notice: Subject to any disclaimer, the term of this patent is extended or adjusted under 35 U.S.C. 154(b) by 768 days.

(21) Appl. No.: 17/800,495

(22) PCT Filed: Mar. 29, 2021

(86) PCT No.: PCT/JP2021/013409

§ 371 (c)(1),
(2) Date: Aug. 17, 2022

(87) PCT Pub. No.: WO2021/215203

PCT Pub. Date: Oct. 28, 2021

(65) Prior Publication Data

US 2023/0160045 A1 May 25, 2023

(30) Foreign Application Priority Data

Apr. 20, 2020 (JP) ................................. 2020-075004

(51) Int. Cl.

| | |
|---|---|
| ***C22C 38/58*** | (2006.01) |
| ***C21D 8/00*** | (2006.01) |
| ***C21D 9/02*** | (2006.01) |
| ***C22C 38/00*** | (2006.01) |
| ***C22C 38/02*** | (2006.01) |
| ***C22C 38/06*** | (2006.01) |
| ***C22C 38/42*** | (2006.01) |
| ***C22C 38/44*** | (2006.01) |
| ***C22C 38/50*** | (2006.01) |
| ***F16F 1/02*** | (2006.01) |

(52) U.S. Cl.

CPC ................ *C22C 38/58* (2013.01); *C21D 8/00* (2013.01); *C21D 9/02* (2013.01); *C22C 38/001* (2013.01); *C22C 38/02* (2013.01); *C22C 38/06* (2013.01); *C22C 38/42* (2013.01); *C22C 38/44* (2013.01); *C22C 38/50* (2013.01); *F16F 1/021* (2013.01); *C21D 2211/001* (2013.01); *F16F 2224/0208* (2013.01)

(58) Field of Classification Search

None

See application file for complete search history.

(56) References Cited

U.S. PATENT DOCUMENTS

| | | | | |
|---|---|---|---|---|
| 2003/0231976 | A1* | 12/2003 | Iseda | C22C 38/58 148/592 |
| 2014/0087208 | A1 | 3/2014 | Toda et al. | |
| 2014/0110022 | A1 | 4/2014 | Sano et al. | |
| 2016/0348202 | A1 | 12/2016 | Nakano | |
| 2017/0167005 | A1* | 6/2017 | Ishizaki | B22F 1/00 |
| 2017/0342517 | A1 | 11/2017 | Nakano | |
| 2018/0265954 | A1 | 9/2018 | Adachi et al. | |
| 2018/0274055 | A1* | 9/2018 | Teraoka | C22C 38/001 |
| 2020/0277680 | A1 | 9/2020 | Yonenaga | |

FOREIGN PATENT DOCUMENTS

| | | | |
|---|---|---|---|
| CN | 103562428 | A | 2/2014 |
| CN | 110499455 | A | 11/2019 |
| JP | 2007002319 | A * | 1/2007 |
| JP | 4450701 | B2 | 4/2010 |
| JP | 4850444 | B2 | 1/2012 |
| JP | 2016-188417 | A | 11/2016 |
| JP | 2018-119174 | A | 8/2018 |
| JP | 2020-41203 | A | 3/2020 |
| KR | 10-2018-0074322 | A | 7/2018 |
| KR | 10-2020-0033903 | A | 3/2020 |
| WO | WO 2015/182585 | A1 | 12/2015 |
| WO | WO 2016/138401 | A1 | 9/2016 |
| WO | WO 2017/057369 | A1 | 4/2017 |

OTHER PUBLICATIONS

Machine translation of JP2007-002319A. (Year: 2007).*

Canadian Office Action for corresponding Canadian Application No. 3,158,884, dated May 4, 2023.

* cited by examiner

*Primary Examiner* — Xiaowei Su

(74) *Attorney, Agent, or Firm* — Birch, Stewart, Kolasch & Birch, LLP

(57) ABSTRACT

An austenitic stainless steel consists of 0.010 to 0.200% by mass of C, 2.00% by mass or less of Si, 3.00% by mass or less of Mn, 0.035% by mass or less of P, 0.0300% by mass or less of S, 6.00 to 14.00% by mass of Ni, 20.0 to 26.0% by mass of Cr, 3.00% by mass or less of Mo, 0.01 to 3.00% by mass of Cu, 1.000% by mass of less of Ti, 0.200% by mass or less of Al, 0.1000% by mass or less of Ca, 0.100 to 0.250% by mass of N, and 0.0080% by mass or less of O, the balance being Fe and impurities.

14 Claims, No Drawings

AUSTENITIC STAINLESS STEEL AND SPRING

FIELD OF THE INVENTION

The present invention relates to austenitic stainless steels and springs.

BACKGROUND OF THE INVENTION

SUS 316L, which is a type of austenitic stainless steel, has good corrosion resistance in corrosive environments such as seawater and salt water, and also has excellent workability. Therefore, it is used in various applications such as household products, building materials, and automobile parts. However, SUS 316L does not have sufficient corrosion resistance depending on applications, and it contains large amounts of expensive elements (Mo, Ni, etc.), resulting in an increased cost of product.

As an austenitic stainless steel having improved corrosion resistance while suppressing the use of expensive elements as much as possible, Patent Literature 1 proposes an austenitic stainless steel having, on its surface, three layers, in order from a surface to an inner layer, of an outermost layer containing Fe and Cr nitrides in a γ phase, a layer composed of an S phase having solid solution of N in a hypersaturation of 10% by mass or more, and a carbon-enriched layer. However, the austenitic stainless steel described in Patent Literature 1 requires a complicated surface treatment in order to form the predetermined layers on the surface, and thus has a problem of a decreased production efficiency and an excess cost for carrying out the surface treatment.

On the other hand, SUS 329J1, which is a kind of austenite/ferrite two-phase stainless steel has better corrosion resistance than that of SUS 316L in corrosive environments such as seawater and salt water, and can reduce the content of expensive element (Ni). Therefore, it is used in various applications such as water tanks and chemical plants. However, since SUS 329J1 has poor workability as compared with SUS 316L, it is difficult to apply it to applications where complicated forming processing is performed.

Further, when the austenitic stainless steel is used as a spring material, improvement in fatigue characteristics is required. In particular, recently, as sizes of electronic devices such as mobile phone terminals and home appliances have been reduced, spring materials such as metal domes for tact switches provided in electronic devices require improved fatigue characteristics in terms of longer life (Patent Literature 2).

PRIOR ART

Patent Literatures

[Patent Literature 1] Japanese Patent Application Publication No. 2016-188417 A

[Patent Literature 2] Japanese Patent Application Publication No. 2020-41203 A

SUMMARY OF THE INVENTION

Problem to be Solved by the Invention

The present invention has been made to solve the above problems. An object of the present invention is to provide an inexpensive austenitic stainless steel having a higher level of corrosion resistance than that of SUS 316L, improved workability as compared with SUS 329J1, and good fatigue characteristics. Another object of the present invention is to provide a spring including the austenitic stainless steel.

Means for Solving the Problem

First, the present inventors have examined a composition of austenitic stainless steel based on the composition of SUS 316L. When the Ni content is reduced, a stable temperature range of a ferrite phase (hereinafter referred to as "a phase") expands, so that it may form a two-phase structure of an austenite phase (hereinafter referred to as "γ phase") and the α phase even at ordinary temperature. If the α phase is present in the γ phase, the workability is deteriorated due to a difference in strength between them. Therefore, in order to ensure the balance between the α phase and the γ phase, it is necessary to add γ generating elements (Mn, Cu, N, etc.). However, if the content of Mn or Cu is increased, the corrosion resistance is decreased, and if the content of N is increased, the hardness is increased to deteriorate the workability. Further, the decreased fatigue characteristics are caused by the fact that the coarse alumina-based inclusions are difficult to be separated by rolling and remain in the austenitic stainless steel. Therefore, it is important to reduce amounts of the coarse inclusions generated. Therefore, the present inventors have optimized the composition of austenitic stainless steel in order to improve workability, corrosion resistance and fatigue characteristics at lower cost.

Further, as a result of producing and analyzing austenitic stainless steels having various compositions, the present inventors have found that an average crystal grain size (R) and stacking fault energy (SFE) are closely related to the workability of the austenitic stainless steels, and that the balance of Al, Ca, Ti and O contents is closely related to the fatigue characteristics of austenitic stainless steels.

Under the above background, the present inventors have found that the above problems can be solved by controlling the composition of the austenitic stainless steel, an E value in which the average crystal grain size (R) and stacking defect energy (SFE) are used as parameters, and an F value in which the Al, Ca, Ti and O contents are used as parameters, and have completed the present invention.

Thus, the present invention relates to an austenitic stainless steel, the austenitic stainless steel consisting of 0.010 to 0.200% by mass of C, 2.00% by mass or less of Si, 3.00% by mass or less of Mn, 0.035% by mass or less of P, 0.0300% by mass or less of S, 6.00 to 14.00% by mass of Ni, 20.0 to 26.0% by mass of Cr, 3.00% by mass or less of Mo, 0.01 to 3.00% by mass of Cu, 1.000% by mass of less of Ti, 0.200% by mass or less of Al, 0.1000% by mass or less of Ca, 0.100 to 0.250% by mass of N, and 0.0080% by mass or less of O, the balance being Fe and impurities, wherein the austenitic stainless steel has an E value represented by the following equation (1) of −17.0 or more, and an F value represented by the following equation (2) of 0 or more:

$$E=-0.33\times SFE+0.25\times R \tag{1}$$

in which SFE is 25.7+2Ni+410C−0.9Cr−77N−13Si−1.2Mn where each symbol of the elements represents a content (% by mass) of each element, and R is an average crystal grain size (μm); and $$F=1003O-211Al-158Ca-79Ti \tag{2}$$

in which each symbol of the elements represents a content (% by mass) of each element.

Further, the present invention relates to a spring comprising the austenitic stainless steel.

Effects of Invention

According to the present invention, it is possible to provide an inexpensive austenitic stainless steel having a higher level of corrosion resistance than that of SUS 316L, improved workability as compared with SUS 329J1, and good fatigue characteristics. Further, according to the present invention, is it possible to provide a spring including the austenitic stainless steel.

DETAILED DESCRIPTION OF THE INVENTION

Hereinafter, embodiments of the present invention will be specifically described. It is to understand that the present invention is not limited to the following embodiments, and those which have appropriately added changes, improvements and the like to the following embodiments based on knowledge of a person skilled in the art without departing from the spirit of the present invention fall within the scope of the present invention.

It should be noted that, as used herein, the expression "%" in relation to any component means "% by mass", unless otherwise specified.

An austenitic stainless steel according to an embodiment of the present invention consists of 0.010 to 0.200% of C, 2.00% or less of Si, 3.00% or less of Mn, 0.035% or less of P, 0.0300% or less of S, 6.00 to 14.00% of Ni, 20.0 to 26.0% of Cr, 3.00% or less of Mo, 0.01 to 3.00% of Cu, 1.000% of less of Ti, 0.200% or less of Al, 0.1000% or less of Ca, 0.100 to 0.250% of N, and 0.0080% or less of O, the balance being Fe and impurities.

The term "impurities" as used herein refer to components contaminated with raw materials such as ore and scrap and various factors in production steps when austenitic stainless steel is industrially produced, which are acceptable as long as they do not have any adverse effect on the present invention.

Further, as used herein, the "austenite-based stainless steel" means a stainless steel having an austenite single-phase metal structure, as well as a stainless steel having a metal structure containing an austenite phase and other phase (for example, a ferrite phase) of 5% by volume or less.

Further, the austenitic stainless steel according to an embodiment of the present invention may further contain 0.0001 to 0.0100% of B.

Also, the austenitic stainless steel according to an embodiment of the present invention may further contain one or more selected from: 0.0001% to 0.1000% of Mg and 0.0001% to 0.1000% of REM.

Also, the austenitic stainless steel according to an embodiment of the present invention may further contain 0.001% to 1.000% of Nb; 0.001% to 1.000% of V; 0.001% to 1.000% of Zr; 0.001 to 1.000% of W; 0.001 to 1.000% of Co; 0.001 to 1.000% of Hf; 0.001 to 1.000% of Ta; 0.001 to 0.100% of Sn.

Each component will be described below in detail.

<0.010 to 0.200% of C>

An excessively high C content will decrease the corrosion resistance of the austenitic stainless steel. Therefore, the upper limit of the C content is controlled to 0.200%, and preferably 0.150%, and more preferably 0.100%. On the other hand, an excessive low content C will lead to an increased refining cost. Therefore, the lower limit of the C content is controlled to 0.010%, preferably 0.015%, and more preferably 0.020%.

As used herein, the "corrosion resistance" means corrosion resistance in corrosive environments containing NaCl such as seawater and salt water.

<2.00% or less of Si>

An excessively high Si content will deteriorate the workability of the austenitic stainless steel. Therefore, the upper limit of the Si content is controlled to 2.00%, and preferably 1.98%, and more preferably 1.95%. On the other hand, the lower limit of the Si content is not particularly limited, but it may preferably be 0.01%, and more preferably 0.05%, and even more preferably 0.10%.

<3.00% or less of Mn>

Mn is an element that produces the austenite phase (γ phase). An excessively high Mn content will decrease the corrosion resistance of the austenitic stainless steel. Therefore, the upper limit of the Mn content is controlled to 3.00%, and preferably 2.95%, and more preferably 2.90%. On the other hand, the lower limit of the Mn content is not particularly limited, but it may preferably be 0.01%, and more preferably 0.05%, and even more preferably 0.10%.

<0.035% or less of P>

An excessively high P content will deteriorate the workability of the austenitic stainless steel. Therefore, the upper limit of the P content is controlled to 0.035%, and preferably 0.034%, and more preferably 0.033%. On the other hand, the lower limit of the P content is not particularly limited, but it may preferably be 0.001%, and more preferably 0.005%, and even more preferably 0.010%.

<0.0300% or less of S>

An excessively high S content will deteriorate the manufacturability of the austenitic stainless steel. Therefore, the upper limit of the S content is controlled to 0.0300%, and preferably 0.0250%, and more preferably 0.0200%. On the other hand, the lower limit of the S content is not particularly limited, but it may preferably be 0.0001%, and more preferably 0.0003%, and even more preferably 0.0005%.

<6.00 to 14.00% of Ni>

Ni is an element that produces the austenite phase (γ phase) as with Mn. Since Ni is expensive, an excessively high content will increase the production cost. Therefore, the upper limit of the Ni content is controlled to 14.00%, and preferably 11.00%, and more preferably 10.00%. On the other hand, an excessively low Ni content will deteriorate the workability of the austenitic stainless steel. Therefore, the lower limit of the Ni content is controlled to 6.00%, and preferably 6.20%, and more preferably 6.50%.

<20.0 to 26.0% of Cr>

An excessively high Cr content will promote the formation of intermetallic compounds (σ phase), so that the workability of the austenitic stainless steel will be deteriorated. Therefore, the upper limit of the Cr content is controlled to 26.0%, and preferably 25.8% or less. On the other hand, an excessively low Cr content cannot provide sufficient corrosion resistance. Therefore, the lower limit of the Cr content is controlled to 20.0%, and preferably 20.5%.

<3.00% or less of Mo>

Since Mo is expensive, an excessively high Mo content will lead to an increase in production cost. Therefore, the upper limit of the Mo content is controlled to 3.00%, and preferably 2.00%, and more preferably 1.00%. On the other hand, the lower limit of the Mo content is not particularly limited, but it may preferably be 0.001%, and more preferably 0.002%, and even more preferably 0.01%.

<0.01 to 3.00% of Cu>

An excessively high Cu content will decrease the corrosion resistance of the austenitic stainless steel. Therefore, the upper limit of the Cu content is controlled to 3.00%, and preferably 2.50%. On the other hand, an excessively low Cu content will deteriorate the workability of the austenitic stainless steel. Therefore, the lower limit of Cu is controlled to 0.01%, and preferably 0.10%, and more preferably 0.15%.

<1.000% or less of Ti>

Ti is an element added to fix C in steel and improve intergranular corrosion resistance. An excessively high Ti content will deteriorate the workability of the austenitic stainless steel, and increase amounts of inclusions, so that the fatigue characteristics of the austenitic stainless steel are also decreased. Therefore, the upper limit of the Ti content is controlled to 1.000%, and preferably 0.800%, and more preferably 0.500%, and still more preferably 0.100%, and even more preferably 0.010%. On the other hand, the lower limit of the Ti content is not particularly limited, but it may preferably be 0.001%, and more preferably 0.005%, and still more preferably 0.010%, in terms of providing the effect of Ti.

<0.200% or less of Al>

An excessively high Al content will increase amounts of inclusions produced and deteriorate the fatigue characteristics of the austenitic stainless steel. Therefore, the upper limit of the Al content is controlled to 0.200%, and preferably 0.100%, and more preferably 0.050%, and even more preferably 0.020%. On the other hand, the lower limit of the Al content is not particularly limited, but it may preferably be 0.0001%, and more preferably 0.0002%, and even more preferably 0.001%.

<0.1000% or less of Ca>

Ca is an element added to improve hot workability. An excessively high Ca content will increase the amounts of inclusions produced and deteriorate the fatigue characteristics of the austenitic stainless steel. Therefore, the upper limit of the Ca content is controlled to 0.1000%, and preferably 0.0500%, and more preferably 0.0100%, and even more preferably 0.0050%. On the other hand, the lower limit of the Ca content is not particularly limited, but it may preferably be 0.0001%, and more preferably 0.0005%, and still more preferably 0.0010%, in terms of providing the effect of Ca.

<0.100 to 0.250% of N>

An excessively high N content will deteriorate the workability of the austenitic stainless steel. Therefore, the upper limit of the N content is controlled to 0.250%, and preferably 0.230%, and more preferably 0.220%. On the other hand, an excessively low N content cannot provide the austenitic stainless steel with sufficient corrosion resistance. Therefore, the lower limit of the N content is controlled to 0.100%, and preferably 0.110%.

<0.0080% or less of O>

O is a factor that produces alumina ($Al_2O_3$)-based inclusions. Since the alumina-based inclusions are hard, they are difficult to be separated even by rolling, and remain as coarse inclusions (having a diameter of 15 μm or more), so that the fatigue characteristics of the austenitic stainless steel are deteriorated. That is, an excessively high O content will increase the amounts of alumina-based inclusions produced and deteriorate the fatigue characteristics of the austenitic stainless steel. Therefore, the upper limit of the O content is controlled to 0.0080% (80 ppm), and preferably 0.0070%, and more preferably 0.0060%. On the other hand, the lower limit of the O content is not particularly limited, but it may preferably be 0.0010%, and more preferably 0.0020%, and even more preferably 0.0030%.

<0.0001 to 0.0100% of B>

B is an element optionally added to improve workability. An excessively high B content will decrease the corrosion resistance of the austenitic stainless steel. Therefore, the upper limit of the B content is controlled to 0.0100%, and preferably 0.0060%, and more preferably 0.0040%. On the other hand, an excessively low content B will decrease the manufacturability of the austenitic stainless steel. Therefore, the lower limit of the B content is controlled to 0.0001%, and preferably 0.0010%.

<0.0001 to 0.1000% of Mg>

Mg is an element optionally added to improve hot workability. From the viewpoint of providing the effect of Mg, the lower limit of the Mg content is controlled to 0.0001%, and preferably 0.0005%, and more preferably 0.0010%. Further, an excessively high Mg content will increase the amounts of inclusions produced and deteriorate the quality. Therefore, the upper limit of the Mg content is controlled to 0.1000%, and preferably 0.0500%, and more preferably 0.0100%.

<0.0001 to 0.1000% of REM>

REM is an element optionally added to improve hot workability. From the viewpoint of providing the effect of REM, the lower limit of the content of REM is controlled to 0.0001%, preferably 0.0005%, and more preferably 0.0010%. Further, since REM is expensive, an excessively high REM content will increase the manufacturing cost. Therefore, the upper limit of the REM content is controlled to 0.1000%, and preferably 0.0500%, and more preferably 0.0100%.

<0.001 to 1.000% of Nb>

Nb is an element optionally added to fix C in steel and improve intergranular corrosion resistance. From the viewpoint of providing the effect of Nb, the lower limit of the content of Nb is controlled to 0.001%, and preferably 0.005%, and more preferably 0.010%. Further, an excessively high Nb content will deteriorate the workability of the austenitic stainless steel. Therefore, the upper limit of the Nb content is controlled to 1.000%, and preferably 0.800%, and more preferably 0.500%.

<0.001 to 1.000% of V>

V is an element optionally added to fix C in steel and improve intergranular corrosion resistance. From the viewpoint of providing the effect of V, the lower limit of the V content is controlled to 0.001%, and preferably 0.005%, and more preferably 0.010%. Further, an excessively low V content will deteriorate the workability of the austenitic stainless steel. Therefore, the upper limit of the V content is controlled to 1.000%, and preferably 0.800%, and more preferably 0.500%.

<0.001 to 1.000% of Zr>

Zr is an element optionally added to fix C in steel and improve intergranular corrosion resistance. From the viewpoint of providing the effect of Zr, the lower limit of the Zr content is controlled to 0.001%, and preferably 0.005%, and more preferably 0.010%. Further, an excessively high Zr content will deteriorate the workability of the austenitic stainless steel. Therefore, the upper limit of the Zr content is controlled to 1.000%, and preferably 0.800%, and more preferably 0.500%.

<0.001 to 1.000% of W>

W is an element optionally added to improve strength at an elevated temperature and corrosion resistance. From the viewpoint of providing the effect of W, the lower limit of the W content is controlled to 0.001%, and preferably 0.005%, and more preferably 0.010%. Further, an excessively high W content will deteriorate the workability of the austenitic stainless steel and increase the production cost. Therefore, the upper limit of the W content is controlled to 1.000%, and preferably 0.800%, and more preferably 0.500%.

<0.001 to 1.000% of Co>

Co is an element optionally added to improve corrosion resistance. From the viewpoint of providing the effect of Co, the lower limit of the Co content is controlled to 0.001%, and preferably 0.005%, and more preferably 0.010%. Further, an excessively high Co content will deteriorate the workability of the austenitic stainless steel and increase the production cost. Therefore, the upper limit of the Co content is controlled to 1.000%, and preferably 0.800%, and more preferably 0.500%.

<0.001 to 1.000% of Hf>

Hf is an element optionally added to fix C in steel and improve intergranular corrosion resistance. From the viewpoint of providing the effect of Hf, the lower limit of the Hf content is controlled to 0.001%, and preferably 0.005%, and more preferably 0.010%. Further, an excessively high Hf content will deteriorate the workability of the austenitic stainless steel. Therefore, the upper limit of the Hf content is controlled to 1.000%, and preferably 0.800%, and more preferably 0.500%.

<0.001 to 1.000% of Ta>

Ta is an element optionally added to fix C in steel and improve intergranular corrosion resistance. From the viewpoint of providing the effect of Ta, the lower limit of the Ta content is controlled to 0.001%, and preferably 0.005%, and more preferably 0.010%. Further, an excessively high Ta content will deteriorate the workability of the austenitic stainless steel. Therefore, the upper limit of the Ta content is controlled to 1.000%, and preferably 0.800%, and more preferably 0.500%.

<0.001 to 0.100% of Sn>

Sn is an element optionally added to improve corrosion resistance. From the viewpoint of providing the effect of Sn, the lower limit of the Sn content is controlled to 0.001%, and preferably 0.005%, and more preferably 0.010%. Further, an excessively high Sn content will deteriorate the manufacturability of the austenitic stainless steel. Therefore, the upper limit of the Sn content is controlled to 0.100%, and preferably 0.050%, and more preferably 0.010%. The austenitic stainless steel according to an embodiment of the present invention has an E value represented by the following equation (1) of −17.0 or more, preferably −10.0 or more:

$$E=-0.33\times\mathrm{SFE}+0.25\times R \quad (1).$$

In the equation (1), SFE is 25.7+2Ni+410C−0.9Cr−77N−13Si−1.2Mn, in which each symbol of the elements represents a content (% by mass) of each element, and R is an average crystal grain size (μm).

By controlling the E value to −17.0 or more, an elongation of 40% or more can be ensured, so that the workability of the austenitic stainless steel can be improved. In particular, the E value of −10.0 or more can ensure an elongation of 45% or more, which can allow for processing into various shapes.

The upper limit of the E value is not particularly limited, but it may preferably be 10.0, and more preferably 9.0, and even more preferably 8.0, in terms of stably ensuring good workability.

As used herein, the "average crystal grain size" is an average crystal grain size of a metal structure in the austenitic stainless steel, and means an average value of the crystal grain size calculated by an intercept method as described below.

The average crystal grain size can be adjusted by controlling conditions such as, for example, rolling reduction rates of hot rolling and cold rolling, and annealing conditions (an annealing temperature, a heating rate, a cooling rate, a heating time (annealing time)), in production steps of the austenitic stainless steel. In general, the average crystal grain size tends to be decreased as the rolling reduction rate is increased, although that cannot be said sweepingly because other conditions are also affected. Further, when the annealing temperature is increased or the heating time is lengthened, the average crystal grain size tends to increase. Furthermore, when the heating rate is increased or the cooling rate is increased, the average crystal grain size tends to decrease.

The average crystal grain size is not particularly limited, but it may preferably be 5 μm or more, in terms of the workability of the austenitic stainless steel. When the austenitic stainless steel is a plate material, the average crystal grain size is preferably half or less the plate thickness (for example, 150 μm or less when the plate thickness is 300 μm).

The austenitic stainless steel according to an embodiment of the present invention has an F value represented by the following equation (2) of 0 or more, and preferably 0.1 or more, and more preferably 0.3 or more:

$$F=1003\mathrm{O}-211\mathrm{Al}-158\mathrm{Ca}-79\mathrm{Ti} \quad (2).$$

In the equation (2), each symbol of the elements represents a content (% by mass) of each element.

The F value is an index representing produced amounts of inclusions having a diameter of 15 μm or more, which will affect the fatigue characteristics. The F value of 0 or more allows the number of inclusions having a diameter of 15 μm or more to be controlled to 1.0/mm$^2$ or less. When the number of inclusions having a diameter of 15 μm or more is 1.0/mm$^2$ or less, the inclusions are in a dispersed state, so that the fatigue characteristics can be improved. The number of inclusions having a diameter of 15 μm or more are preferably 0/mm$^2$, but it may be, for example, 0.01/mm$^2$ or more.

The upper limit of the F value is not particularly limited, but it may preferably be 10.0, and more preferably 8.0, and even more preferably 6.0, in terms of stably ensuring good fatigue characteristics.

Here, the number density (number/mm$^2$) of inclusions having a diameter of 15 μm or more can be measured by observing a cross section of an austenitic stainless steel with an FE-SEM (Field Emission Scanning Electron Microscope).

The austenitic stainless steel according to an embodiment of the present invention preferably has a pitting potential of 0.70 V or more. When the pitting potential is in such a range, it can be said that the austenitic stainless steel has a higher level of corrosion resistance than that of SUS 316L. The upper limit of the pitting potential is not particularly limited, but it may be, for example, 2.00 V, and preferably 1.50 V.

Here, the pitting potential can be measured by a method as described below. The potential is based on Ag/AgCl.

A shape of the austenitic stainless steel according to the embodiment of the present invention is not particularly limited as long as it has the features as described above. For example, the austenitic stainless steel can be various plate materials such as hot-rolled plates, hot-rolled annealed plates, cold-rolled plates, and cold-rolled annealed plates. The cold-rolled annealed plate is preferable in terms of manufacturability.

The austenitic stainless steel according to an embodiment of the present invention can be produced by using a method known in the art with the exception that the stainless steel having the above composition is smelted. More particularly, when the austenitic stainless steel is the cold-rolled annealed plate, it can be produced as follows. First, a stainless steel having the above composition is melted to forge or cast it, and then hot-rolled to obtain a hot-rolled plate. The hot-rolled plate is then annealed, washed with an acid, and cold-rolled, as needed, to obtain a cold-rolled plate. The cold-rolled plate is then annealed and washed with an acid, as needed, to obtain a cold-rolled annealed plate.

It should be noted that the conditions in each step may optionally be adjusted according to the composition of the stainless steel, and are not particularly limited.

The austenitic stainless steel according to the embodiment of the present invention having the above features has better workability than that of SUS 329J1 and has higher corrosion resistance than that of SUS 316L in corrosive environments containing NaCl such as seawater and salt water. Therefore, the austenitic stainless steel can be used as a material for various members used in more severe corrosive environments. For example, the austenitic stainless steel according to the embodiment of the present invention is suitably used for household goods, building members (structural members), automobile parts, electronic parts, water tanks, chemical plants and the like. In particular, the austenitic stainless steel according to the embodiment of the present invention is particularly suitable for use as a spring material utilized for spiral springs, springs for electronic device parts, and the like, because it can also improve the fatigue characteristics.

Further, the austenitic stainless steel can reduce the production cost by decreasing the contents of expensive elements such as Mo and Ni.

The spring according to an embodiment of the present invention includes the austenitic stainless steel as described above. Since the spring according to the embodiment of the present invention includes the austenitic stainless steel as described above, the spring can have good workability and good corrosion resistance, and can also have improved fatigue characteristics. Therefore, the life of the spring can be improved. The type of spring is not particularly limited, but a leaf spring may be preferred.

EXAMPLES

Hereinafter, the present invention will be described in detail with reference to Examples. However, it should not be construed that the present invention is limited to those Examples.

Thirty Kilograms of stainless steel having each composition as shown in Table 1 were melted by vacuum melting, forged into a plate having a thickness of 30 mm, heated at 1230° C. for 2 hours, and then hot-rolled to a thickness of 4 mm to obtain a hot-rolled plate. The hot-rolled plate was then annealed and washed with an acid to obtain a hot-rolled annealed plate, and the hot-rolled annealed plate was then cold-rolled to a thickness of 0.3 mm or 1.0 mm to obtain a cold-rolled plate. Subsequently, the cold-rolled plate was annealed, then cooled with water and washed with an acid to obtain a cold-rolled annealed plate. In addition, the steel No. K is a steel grade corresponding to SUS 329J1, and the steel No. M is a steel grade corresponding to SUS 316L containing a large amount of Ni and Mo.

TABLE 1

| Steel | Composition (% by mass) | | | | | | | | | | | | | | | |
|---|---|---|---|---|---|---|---|---|---|---|---|---|---|---|---|---|
| No. | C | Si | Mn | P | S | Ni | Cr | Mo | Cu | Ti | Al | Ca | N | O | Others | SFE | F Value |
| A | 0.069 | 0.41 | 0.77 | 0.031 | 0.0012 | 9.85 | 24.0 | <0.01 | 0.21 | 0.000 | 0.016 | 0.0000 | 0.103 | 0.0040 | — | 37.9 | 0.6 |
| B | 0.073 | 0.38 | 0.82 | 0.030 | 0.0017 | 8.20 | 21.4 | 0.15 | 0.20 | 0.000 | 0.013 | 0.0000 | 0.160 | 0.0045 | B: 0.0023 | 34.5 | 1.8 |
| C | 0.071 | 0.42 | 0.81 | 0.031 | 0.0015 | 7.97 | 22.1 | 0.15 | 0.20 | 0.000 | 0.013 | 0.0000 | 0.150 | 0.0048 | REM: 0.005 | 32.9 | 2.1 |
| D | 0.022 | 0.39 | 0.82 | 0.032 | 0.0017 | 8.20 | 20.2 | 0.13 | 0.21 | 0.000 | 0.017 | 0.0050 | 0.140 | 0.0060 | B: 0.0031 | 16.1 | 1.6 |
| E | 0.060 | 0.40 | 0.74 | 0.029 | 0.0014 | 6.70 | 20.4 | <0.01 | 0.08 | 0.000 | 0.015 | 0.0000 | 0.121 | 0.0068 | W: 0.320 | 29.9 | 3.7 |
| F | 0.090 | 0.37 | 1.20 | 0.034 | 0.0020 | 13.02 | 21.3 | 2.10 | 0.50 | 0.000 | 0.018 | 0.0000 | 0.113 | 0.0043 | B: 0.0021<br>Nb: 0.105 | 54.5 | 0.5 |
| G | 0.043 | 1.70 | 0.78 | 0.030 | 0.0016 | 13.20 | 20.3 | 0.15 | 0.05 | 0.000 | 0.017 | 0.0000 | 0.104 | 0.0047 | B: 0.0034<br>Hf: 0.050<br>Ta0.050 | 20.4 | 1.1 |
| H | 0.070 | 0.50 | 2.47 | 0.030 | 0.0022 | 6.30 | 24.6 | 0.23 | 2.53 | 0.000 | 0.015 | 0.0000 | 0.245 | 0.0050 | Mg: 0.005<br>V: 0.106<br>Sn: 0.010 | 16.5 | 1.9 |
| I | 0.029 | 0.45 | 0.79 | 0.028 | 0.0013 | 8.38 | 20.8 | 0.18 | 0.31 | 0.010 | 0.012 | 0.0050 | 0.168 | 0.0046 | Co: 0.050<br>Zr: 0.050 | 15.9 | 0.5 |
| J | 0.090 | 0.40 | 0.40 | 0.031 | 0.0015 | 13.87 | 20.2 | <0.01 | 0.21 | 0.000 | 0.016 | 0.0000 | 0.120 | 0.0050 | — | 57.2 | 1.6 |
| K | 0.010 | 0.50 | 0.30 | 0.032 | 0.0020 | 4.60 | 24.8 | 1.80 | 0.20 | 0.000 | 0.030 | 0.0000 | 0.130 | 0.0036 | B: 0.020<br>Sn: 0.010 | −0.2 | −2.7 |
| L | 0.073 | 0.40 | 0.82 | 0.033 | 0.0014 | 7.94 | 20.4 | 0.07 | 0.50 | 0.000 | 0.021 | 0.0050 | 0.080 | 0.0029 | B: 0.0023 | 40.8 | −2.3 |
| M | 0.019 | 0.51 | 1.74 | 0.031 | 0.0010 | 12.10 | 17.3 | 2.09 | 0.37 | 0.000 | 0.001 | 0.0000 | 0.007 | 0.0040 | — | 32.9 | 3.8 |
| N | 0.070 | 0.40 | 0.81 | 0.033 | 0.0016 | 7.89 | 18.1 | 0.15 | 0.20 | 0.000 | 0.013 | 0.0000 | 0.104 | 0.0048 | B: 0.0020<br>V: 0.050 | 39.7 | 2.1 |
| O | 0.071 | 0.41 | 0.83 | 0.029 | 0.0015 | 13.80 | 19.1 | <0.01 | 0.20 | 0.000 | 0.001 | 0.0000 | 0.110 | 0.0086 | B: 0.0030<br>Sn: 0.010 | 50.4 | 8.4 |
| P | 0.071 | 0.42 | 0.81 | 0.031 | 0.0015 | 8.91 | 21.8 | 0.22 | 2.05 | 0.000 | 0.104 | 0.0000 | 0.123 | 0.0022 | V: 0.102 | 37.1 | −19.7 |
| Q | 0.070 | 0.41 | 1.03 | 0.033 | 0.0019 | 6.20 | 20.0 | 0.14 | 0.19 | 0.104 | 0.023 | 0.0000 | 0.230 | 0.0038 | Mg: 0.005 | 24.5 | −9.3 |
| R | 0.051 | 0.80 | 2.03 | 0.028 | 0.0008 | 10.32 | 21.7 | 0.25 | 0.20 | 0.000 | 0.080 | 0.0000 | 0.105 | 0.0025 | B: 0.0022<br>REM: 0.005<br>Sn: 0.010 | 26.8 | −14.4 |

(Remarks)
The balance is Fe and impurities.
Underlines indicate that they are out of the scope of the present invention.
Of the Mo contents, "<0.01" indicates that it is less than the detection limit (0.01% by mass).

The cold-rolled annealed plates obtained above were subjected to the following evaluations.

<Average Crystal Grain Size>

The crystal grain size of the metal structure was evaluated using each cold-rolled annealed plate obtained by cold rolling to a thickness of 0.3 mm, annealing, water cooling and washing with an acid. More particularly, a sample having 15 mm×20 mm was cut out from the center of the cold-rolled annealed plate in the width direction and subjected to a sensitization at 700° C. for 30 minutes, and the cross section in the thickness direction parallel to the rolling direction (L direction) of the cold-rolled annealed plate was mirror-polished, electrolytically etched with oxalic acid, and then measured by observing the etched surface with an optical microscope. In the observation with the optical microscope, a region having about 240 μm×320 μm in the etched surface was observed in five fields of view, the number of crystal grains was calculated using the intercept method, and the average crystal grain size was obtained. In each field of view, a straight line having a length of 320 μm was drawn, the number of crystal grains across the straight line was obtained, and "length of straight line (320 μm)/number of crystal grains" was defined as the crystal grain size in that field of view, and an average of the five fields of view was determined to be the average crystal grain size. The number of crystal grains at each end of the straight line was counted as ½.

<Ratio of Ferrite Phase>

The ratio of the ferrite phase was evaluated using each cold-rolled annealed plate obtained by cold rolling to a thickness of 0.3 mm, annealing, water cooling and washing with an acid. Five samples each having 50 mm×50 mm were cut out from the center of the cold-rolled annealed plate in the width direction, and the five cut-out samples were stacked. The amount of ferrite phase (α phase) was then measured using a ferrite scope (FERITESCOPE (registered trademark) FMP 30 from Fisher). The measurement was carried out at arbitrary three points on the surface of each sample, and an average value thereof was used as the result.

<Number of Inclusions Having Diameter of 15 μm or More>

The number density of inclusions having a diameter of 15 μm or more was evaluated using each cold-rolled annealed plate obtained by cold rolling to a thickness of 1.0 mm, annealing, water cooling and washing with an acid. More particularly, a sample having 15 mm×30 mm was cut out from the center of the cold-rolled annealed plate in the width direction, and the sample was embedded in a resin such that the cross section in the thickness direction (C cross section) perpendicular to the rolling direction of the cold-rolled annealed plate was exposed, and the C cross section was mirror-polished. Subsequently, using FE-SEM (SU5000) from Hitachi High-Tech Corporation, the central part of the C cross section of the above sample was observed in 60 fields (observation area: about 18.4 $mm^2$) at magnifications of 200 times, and the number of inclusions having a diameter of 15 μm or more was counted. Here, inclusions in which a value of square root of a value (a×b) obtained by multiplying a major axis length a and a minor axis length b of the inclusion was 15 μm or more ere defined as inclusions having a diameter of 15 μm or more. By dividing the number of inclusions thus obtained by the observation area, the number density (number/$mm^2$) of inclusions having a diameter of 15 μm or more was calculated.

<Workability>

The workability was evaluated using each cold-rolled annealed plate obtained by cold rolling to a thickness of 0.3 mm, annealing, water cooling and washing with an acid. The workability was in accordance with the tensile test method defined in JIS Z 2241: 2011. More particularly, a No. 13B sample was cut out from the central portion of each cold-rolled annealed plate in the width direction, and subjected to a tensile test at a tensile rate of 20 mm/min, and an elongation (%) was measured. In this evaluation, those which achieved an elongation of 40% capable of being processed into various shapes were determined to be passed (A), and those having an elongation of less than 40% were determined to be rejected (B).

<Corrosion Resistance>

The corrosion resistance was evaluated using each cold-rolled annealed plate obtained by cold rolling to a thickness of 1.0 mm, annealing, water cooling and washing with an acid. The corrosion resistance was in accordance with JIS G 0577: 2014. The cold-rolled annealed plate was subjected to wet polishing at #600 after cutting out a sample having a size of 15 mm×20 mm from the central portion in the width direction. A portion other than an electrode surface (exposed portion) was then insulation-coated with a silicone resin such that the electrode surface of the sample had a size of 10 mm×10 mm, thereby obtaining a sample for measuring pitting potential. The sample for measuring pitting potential was immersed in a 3.5% NaCl solution at 30° C., which had been sufficiently degassed with Ar, and anodic polarization was carried out at 20 mV/min from spontaneous potential to measure pitting potential. The pitting potential was potential when a current of 100 $\mu A/cm^2$ flowed. In this evaluation, samples in which the pitting potential was 0.7 V vs. Ag/AgCl (hereinafter, all potentials are based on Ag/AgCl) or more were determined to be passed (A), and those having less than 0.7 V were determined to be rejected (B).

<Fatigue Characteristics>

The fatigue characteristics were evaluated using each cold-rolled annealed plate obtained by cold rolling to a thickness of 1.0 mm, annealing, water cooling and washing with an acid. More particularly, a sample having a width of 30 mm, a length of 90 mm, and R portions with R=4.25 mm at both ends in the width direction, where the minimum plate width of each R portion was 20 mm, was cut out from the central portion of the cold-rolled annealed plate in the width direction. In addition, the length direction of the sample was defined as the rolling direction. Next, a planar bending fatigue test was conducted under conditions of a maximum stress of 650 MPa, a repetition rate of 1500 cpm, completely reversing, and a number of times of test stop of $1\times10^7$ cycles. In this evaluation, samples in which the number of times of durability was $1\times10^7$ were determined to be passed (A), and samples in which the number of times of durability was less than $1\times10^7$ were determined to be rejected (B).

The results of each of the above evaluations are shown in Table 2.

TABLE 2

| | Steel No. | Average Crystal Grain Size (μm) | α Phase (vol. %) | E Value | Number Density of Inclusions (Number/$mm^2$) | Workability: Elongation (%) | Workability: Evaluation Results | Corrosion Resistance: Pitting Potential (V) | Corrosion Resistance: Evaluation Results | Fatigue Characteristics: Number of Times of Durability (Times) | Fatigue Characteristics: Evaluation Results |
|---|---|---|---|---|---|---|---|---|---|---|---|
| Example 1 | A | 34 | 4.2 | −4.0 | 0.7 | 45.5 | A | 1.18 | A | 10000000 | A |
| Example 2 | B | 32 | 0 | −3.4 | 0.5 | 48.1 | A | 0.81 | A | 10000000 | A |
| Example 3 | C | 14 | 1.3 | −7.3 | 0.5 | 47.2 | A | 0.87 | A | 10000000 | A |
| Example 4 | D | 8 | 0 | −3.3 | 0.6 | 49.2 | A | 0.74 | A | 10000000 | A |
| Example 5 | D | 37 | 0 | 3.9 | 0.4 | 54.4 | A | 0.78 | A | 10000000 | A |
| Example 6 | E | 43 | 2.5 | 0.9 | 0.8 | 51.4 | A | 0.72 | A | 10000000 | A |
| Example 7 | F | 5 | 1.6 | −16.7 | 0.9 | 40.2 | A | 1.23 | A | 10000000 | A |
| Example 8 | G | 56 | 0 | 7.3 | 0.7 | 55.3 | A | 0.71 | A | 10000000 | A |
| Example 9 | H | 24 | 0 | 0.6 | 0.8 | 43.6 | A | 1.06 | A | 10000000 | A |
| Example 10 | I | 25 | 0 | 1.1 | 0.9 | 49.8 | A | 0.80 | A | 10000000 | A |
| Comp. 1 | J | 6 | 0 | −17.4 | 0.8 | 33.1 | B | 0.72 | A | 10000000 | A |
| Comp. 2 | K | 10 | 41.0 | 2.6 | 1.4 | 30.4 | B | 1.19 | A | 5875600 | B |
| Comp. 3 | L | 39 | 1.3 | −3.7 | 1.1 | 47.8 | A | 0.58 | B | 8427000 | B |
| Comp. 4 | M | 30 | 0 | −3.3 | 0.4 | 47.2 | A | 0.54 | B | 10000000 | A |
| Comp. 5 | N | 34 | 0 | −4.6 | 0.7 | 44.9 | A | 0.41 | B | 10000000 | A |
| Comp. 6 | O | 28 | 0 | −9.6 | 0.4 | 41.9 | A | 0.60 | B | 10000000 | A |
| Comp. 7 | P | 44 | 0 | −1.2 | 1.7 | 50.3 | A | 0.80 | A | 4848800 | B |
| Comp. 8 | Q | 31 | 0 | −0.3 | 1.3 | 50.2 | A | 0.77 | A | 7119900 | B |
| Comp. 9 | R | 36 | 0 | 0.2 | 1.6 | 49.7 | A | 0.81 | A | 6476000 | B |

(Remarks)
The underlines indicate that they are out of the scope of the present invention.

As shown in Tables 1 and 2, each of the cold-rolled annealed plates (austenitic stainless steels) of Examples 1 to 10 satisfied the predetermined composition, E value and F value, so that all the results of the workability, corrosion resistance and fatigue strength were good.

However, the cold-rolled annealed plate (austenitic stainless steel) of Comparative Example 1 had insufficient workability because the E value was out of the range.

The cold-rolled annealed plate (austenite-ferrite two-phase stainless steel; SUS 329J1) of Comparative Example 2 had a two-phase structure of α phase and γ phase so that the workability was not sufficient, because the Ni content was too low. Further, since the F value of the cold-rolled annealed plate was also beyond the predetermined range, the fatigue characteristics were not sufficient.

The cold-rolled annealed plate (austenitic stainless steel) of Comparative Example 3 had insufficient corrosion resistance because the content of N was too low. Further, since the F value of the cold-rolled annealed plate was also beyond the predetermined range, the fatigue characteristics were not sufficient.

The cold-rolled annealed plate (austenitic stainless steel; SUS 316L) of Comparative Example 4 had insufficient corrosion resistance and contained larger amounts of Ni and Mo, so that the production cost was higher.

The cold-rolled annealed plate (austenitic stainless steel) of Comparative Example 5 had insufficient corrosion resistance because the Cr content was too low.

The cold-rolled annealed plate (austenitic stainless steel) of Comparative Example 6 had insufficient corrosion resistance because the Cr content was too low and the O content was too high.

Each of the cold-rolled steel sheets (austenitic stainless steels) of Comparative Examples 7 to 9 had insufficient fatigue characteristics because the F value was out of the predetermined range.

As can be seen from the above results, according to the present invention, it is possible to provide an inexpensive austenitic stainless steel having a higher level of corrosion resistance than that of SUS 316L, improved workability as compared with SUS 329J1, and good fatigue characteristics.

The invention claimed is:

1. An austenitic stainless steel plate, the austenitic stainless steel plate comprising 0.010 to 0.200% by mass of C, 2.00% by mass or less of Si, 3.00% by mass or less of Mn, 0.035% by mass or less of P, 0.0300% by mass or less of S, 6.00 to 14.00% by mass of Ni, 20.0 to 26.0% by mass of Cr, 3.00% by mass or less of Mo, 0.01 to 3.00% by mass of Cu, 1.000% by mass or less of Ti, 0.200% by mass or less of Al, 0.1000% by mass or less of Ca, 0.100 to 0.250% by mass of N, 0.0080% by mass or less of O, and further comprising 0.105% by mass or less of Nb, the balance being Fe and impurities, wherein the austenitic stainless steel plate has an E value represented by the following equation (1) of −17.0 or more, and an F value represented by the following equation (2) of 0 or more:

$$E=-0.33\times\text{SFE}+0.25\times R \quad (1)$$

in which SFE is 25.7+2Ni+410C−0.9Cr−77N−13Si−1.2Mn where each symbol of the elements represents a content (% by mass) of each element, and R is an average crystal grain size (μm); and $$F=1003\text{O}-211\text{Al}-158\text{Ca}-79\text{Ti} \quad (2)$$

in which each symbol of the elements represents a content (% by mass) of each element, and wherein a number of inclusions having a diameter of 15 μm or more is 1.0/$mm^2$ or less.

2. The austenitic stainless steel plate according to claim 1, further comprising 0.0001 to 0.0100% by mass of B.

3. The austenitic stainless steel plate according to claim 2, further comprising one or more selected from: 0.0001 to 0.1000% by mass of Mg and 0.0001 to 0.1000% by mass of REM.

4. The austenitic stainless steel plate according to claim 2, further comprising one or more selected from: 0.001 to 0.105% by mass of Nb, 0.001 to 1.000% by mass of V, 0.001 to 1.000% by mass of Zr, 0.001 to 1.000% by mass of W, 0.001 to 1.000% by mass of Co, 0.001 to 1.000% by mass of Hf, 0.001 to 1.000% by mass of Ta, and 0.001 to 0.100% by mass of Sn.

5. The austenitic stainless steel plate according to claim 2, wherein the content of Al is 0.020% by mass or less, the content of Ca is 0.0001 to 0.0050% by mass, and the content of Ti is 0.001 to 0.010% by mass.

6. The austenitic stainless steel plate according to claim 2, wherein the austenitic stainless steel plate has a pitting potential of 0.70 V or more.

7. The austenitic stainless steel plate according to claim 1, further comprising one or more selected from: 0.0001 to 0.1000% by mass of Mg and 0.0001 to 0.1000% by mass of REM.

8. The austenitic stainless steel plate according to claim 7, further comprising one or more selected from: 0.001 to 0.105% by mass of Nb, 0.001 to 1.000% by mass of V, 0.001 to 1.000% by mass of Zr, 0.001 to 1.000% by mass of W, 0.001 to 1.000% by mass of Co, 0.001 to 1.000% by mass of Hf, 0.001 to 1.000% by mass of Ta, and 0.001 to 0.100% by mass of Sn.

9. The austenitic stainless steel plate according to claim 7, wherein the content of Al is 0.020% by mass or less, the content of Ca is 0.0001 to 0.0050% by mass, and the content of Ti is 0.001 to 0.010% by mass.

10. The austenitic stainless steel plate according to claim 1, further comprising one or more selected from: 0.001 to 0.105% by mass of Nb, 0.001 to 1.000% by mass of V, 0.001 to 1.000% by mass of Zr, 0.001 to 1.000% by mass of W, 0.001 to 1.000% by mass of Co, 0.001 to 1.000% by mass of Hf, 0.001 to 1.000% by mass of Ta, and 0.001 to 0.100% by mass of Sn.

11. The austenitic stainless steel plate according to claim 10, wherein the content of Al is 0.020% by mass or less, the content of Ca is 0.0001 to 0.0050% by mass, and the content of Ti is 0.001 to 0.010% by mass.

12. The austenitic stainless steel plate according to claim 1, wherein the content of Al is 0.020% by mass or less, the content of Ca is 0.0001 to 0.0050% by mass, and the content of Ti is 0.001 to 0.010% by mass.

13. The austenitic stainless steel plate according to claim 1, wherein the austenitic stainless steel plate has a pitting potential of 0.70 V or more.

14. A spring comprising the austenitic stainless steel plate according to claim 1.

* * * * *